US011734980B2

(12) United States Patent
Galley et al.

(10) Patent No.: US 11,734,980 B2
(45) Date of Patent: Aug. 22, 2023

(54) QUEUING SYSTEM

(71) Applicant: ACCESSO TECHNOLOGY GROUP PLC, Twyford (GB)

(72) Inventors: Christopher Simon Galley, Twyford (GB); Christopher Simon Peter Barnaby, Twyford (GB); Ian Francis, Twyford (GB); Dominic Light, Twyford (GB)

(73) Assignee: ACCESSO TECHNOLOGY GROUP PLC, Twyford (GB)

( * ) Notice: Subject to any disclaimer, the term of this patent is extended or adjusted under 35 U.S.C. 154(b) by 0 days.

(21) Appl. No.: 16/518,614

(22) Filed: Jul. 22, 2019

(65) Prior Publication Data

US 2019/0347885 A1    Nov. 14, 2019

Related U.S. Application Data

(63) Continuation-in-part of application No. 15/315,712, filed as application No. PCT/GB2015/051607 on Jun. 2, 2015, now Pat. No. 11,393,271.

(30) Foreign Application Priority Data

Jun. 2, 2014 (GB) ...................................... 1409764

(51) Int. Cl.
*G07C 11/00* (2006.01)
*G06Q 10/02* (2012.01)
(Continued)

(52) U.S. Cl.
CPC ............. *G07C 11/00* (2013.01); *G06Q 10/02* (2013.01); *H04L 9/088* (2013.01); *G07C 2011/02* (2013.01); *G07C 2011/04* (2013.01)

(58) Field of Classification Search
CPC . G07C 11/00; G07C 2011/02; G07C 2011/04; G06Q 10/02; H04L 9/088; H04L 49/9047; H04L 9/0833; H04L 9/3213
(Continued)

(56) References Cited

U.S. PATENT DOCUMENTS 5,754,660 A   5/1998 Shimizu
5,784,467 A   7/1998 Asayama
(Continued)

FOREIGN PATENT DOCUMENTS

CN    101006475 A    7/2007
CN    101308616 A    11/2008
(Continued)

OTHER PUBLICATIONS

Passy, Charles; "What You Get With VIP Status at Theme Parks"; May 17, 2007. (Year: 2007).*
(Continued)

*Primary Examiner* — Resha Desai
*Assistant Examiner* — Dione N. Simpson
(74) *Attorney, Agent, or Firm* — Foley & Lardner LLP

(57) ABSTRACT

A technique for controlling access to one or more attractions is achieved using a number of access keys, each being issued to one or more users. An electronic queue management part manages a virtual queue in respect of each attraction and receives electronic requests for attraction access, each request relating to an access key and being for the users associated with it to access a particular attraction. Receipt of each request causes the respective users to be added to a corresponding virtual queue. A time at which each group of users reaches the front of the virtual queue and can access the attraction is determined. The users access the attractions by presenting an access key to an access control part, in communication with the electronic queue management part.

(Continued)

Only a user presenting an access key at the correct time for accessing the attraction is allowed access to the attraction.

19 Claims, 5 Drawing Sheets

(51) Int. Cl.
*H04L 9/08* (2006.01)
*H04L 49/9047* (2022.01)

(58) Field of Classification Search
USPC .............................................................. 705/5
See application file for complete search history.

(56) References Cited

U.S. PATENT DOCUMENTS

| | | | |
|---|---|---|---|
| 5,978,770 | A | 11/1999 | Waytena et al. |
| 6,154,549 | A | 11/2000 | Arnold et al. |
| 6,496,207 | B1 | 12/2002 | Matsuda et al. |
| 6,529,786 | B1 | 3/2003 | Sim |
| 6,760,050 | B1 | 7/2004 | Nakagawa |
| 6,973,192 | B1 | 12/2005 | Gerrard et al. |
| 7,027,600 | B1 | 4/2006 | Kaji et al. |
| 7,319,760 | B2 | 1/2008 | Sekine et al. |
| 8,606,605 | B2 | 12/2013 | Bayne et al. |
| 9,135,791 | B2 | 9/2015 | Nakamura et al. |
| 11,393,271 | B2 | 7/2022 | Galley et al. |
| 2003/0102956 | A1 | 6/2003 | McManus et al. |
| 2004/0104912 | A1 | 6/2004 | Yamamoto et al. |
| 2005/0089053 | A1* | 4/2005 | Zhu ................... H04M 3/5232 370/412 |
| 2007/0196801 | A1 | 8/2007 | Nagasaka et al. |
| 2007/0239409 | A1 | 10/2007 | Alan |
| 2007/0286220 | A1* | 12/2007 | Stenning ................ G07C 11/00 370/412 |
| 2010/0117790 | A1 | 5/2010 | Bayne et al. |
| 2010/0162121 | A1 | 6/2010 | Yoakum et al. |
| 2010/0261526 | A1 | 10/2010 | Anderson et al. |
| 2010/0277276 | A1 | 11/2010 | Bayne et al. |
| 2011/0199302 | A1 | 8/2011 | Tossell et al. |
| 2012/0078668 | A1 | 3/2012 | Hirose et al. |
| 2012/0219164 | A1 | 8/2012 | Li et al. |
| 2014/0019603 | A1 | 1/2014 | Dunko |

FOREIGN PATENT DOCUMENTS

| | | |
|---|---|---|
| CN | 101807264 A | 8/2010 |
| CN | 102651214 A | 8/2012 |
| CN | 102939619 A | 2/2013 |
| CN | 104134226 A | 11/2014 |
| JP | H06243229 A | 9/1994 |
| JP | H10340299 A | 12/1998 |
| JP | H11272156 A | 10/1999 |
| JP | 2003044618 A | 2/2003 |
| JP | 2005309885 A | 11/2005 |
| JP | 2007164291 A | 6/2007 |
| JP | 2007212635 A | 8/2007 |
| JP | 2008502971 A | 1/2008 |
| WO | 03034350 A2 | 4/2003 |
| WO | WO-03/034350 A1 | 4/2003 |
| WO | 2005124699 A1 | 12/2005 |
| WO | WO-2005/124699 A1 | 12/2005 |
| WO | 2011141561 A1 | 11/2011 |

OTHER PUBLICATIONS

English Summary of First Chinese (SIPO) Office Action, dated Sep. 29, 2018, in corresponding Chinese Patent Application No. 201580029155.0, 18 pages.

Doel et al., "Physically-based Sound Effects for Interactive Simulation and Animaton", ACM SIGGRAPH 2001, pp. 537-544.

Funkhouser et al., Real-Time Acoustic Modeling for Distributed Virtual Environments, ResearchGate, 2004, pp. 1-11.

O'Brien et al., Synthesizing Sounds from Rigid-Body Simulations, ACM, 2002, pp. 1-7.

O'Brien et al., Synthesizing Sounds from Physically Based Motion, ACM, 2001, pp. 1-8.

International Search Report in International Application No. PCT/CN2015/073780, dated May 27, 2015.

English Translation of the Written Opinion of the International Search Authority in International Application No. PCT/CN2015/073780, dated May 27, 2015.

Notification of Transmittal of the International Search Report and the Written Opinion of the International Searching Authority, or the Declaration issued in International Application No. PCT/GB2015/051607, dated Aug. 12, 2015.

Patents Act 1977: Search Report under Section 17(5) issued in Application No. GB1409764.6 dated Nov. 26, 2014.

Foreign Action other than Search Report for EP Appl. Ser. No. 15728092.6 dated Feb. 19, 2021 (11 pages).

Jerseykids, "What Happens When a Disney Ride Breaks Down", Apr. 20, 2013, XP055775681, retrieved from the Internet: URL: https://jerseykids.net/2013/04/20/what-happens-when-a-disney-ride-breaks-down/ [retrieved on May 19, 2021], 7 pages.

Niles, "What's fair compensation for theme park guests who are evacuated from rides?", Theme Park Insider, Apr. 3, 2013, XP055775687, Retrieved from the Internet: URL: https://www.themeparkinsider.com/flume/201304/3432/ [retrieved on May 19, 2021], 4 pages.

Pawlowski, "Queuing psychology: Can waiting in line be fun?", CNN, Nov. 20, 2008, XP055775674, Retrieved from the Internet: URL: http://edition.cnn.com/2008/TECH/science/11/20/queuing.psychology/ [retrieved on May 19, 2021], 2 pages.

Chu et al., "Simulation of Theme Park Queuing System by using Arena," 2013 Ninth International Conference on Intelligent Information Hiding and Multimedia Signal Processing, Oct. 16-18, 2013, 4 pages.

\* cited by examiner

QUEUING SYSTEM

CROSS-REFERENCE TO RELATED APPLICATIONS

This application is a Continuation-In-Part Application of U.S. patent application Ser. No. 15/315,712, filed Dec. 1, 2016, which is a National Stage Application of PCT/GB2015/051607, filed Jun. 2, 2015, which claims priority to GB 1409764.6, filed Jun. 2, 2014, each of which is hereby incorporated herein by reference of their entirety.

BACKGROUND TO THE INVENTION

Queuing systems are employed in various types of situation where multiple users wish to access the same resource or attraction at the same time or as early as possible, including restaurants, amusement park rides, museum or gallery exhibits, service counters or meetings and other similar activities. In such situations, a physical queue is often used. A ticket-based queuing system (a so-called 'deli-counter' ticket) is an improvement on this, but still groups all waiting users together.

A priority queuing system, which can differentiate between users is a further improvement. Current priority queuing systems involve the use of a physical standby queue and some form of priority queue, which may either be virtual or physical (stand-in-line). Virtual queuing systems have been used for many years, for example those described in U.S. Pat. Nos. 5,978,770, 6,529,786, 8,606,605 and US-2010/0117790. These use electronic systems to manage the priority queue, rather than all of the users waiting in physical queues. Virtual queues offer benefits to attraction operators and users (also referred to as guests in the context of an amusement park, for instance), since time spent waiting in a physical queue is considered wasted and could be spent on other activities.

However, such second line priority systems have problems. Firstly, they can cause guest resentment. Priority guests (particularly those with a 'front of line' pass) may be seen by other (stand-by) guests getting to the front of the line a number of times before that stand-by guest has themselves reached the front of line. Also, such priority systems require more than one physical entry point, so existing attraction entrances need remodelling with separate entry points keeping the two queues separate. Extra staff or equipment is often required for these additional entry points, increasing costs and complexity. Thus, an amusement park cannot realistically manage more than two queues per attraction with this system.

Where multiple attractions are being managed at the same time, the complexity and costs increase by an order of magnitude, especially when a parallel virtual queuing system is set up for each attraction. Thus, management of guests or users for such queuing systems in a cost-efficient and operationally-efficient way remains a challenge

SUMMARY OF THE INVENTION

Against this background, there is provided a queuing system for controlling access by a plurality of users to one or more attractions (that is, one attraction or a plurality of attractions). The plurality of users have a plurality of access keys and each access key is associated with at least one user from the plurality of users. Each user is allocated to one of a plurality of groups. The plurality of groups comprise a first group and a second group.

The queuing system comprises an electronic queue management part, configured to manage at least one virtual queue, each of the at least one virtual queue being associated with a respective attraction of the one or more attractions, the electronic queue management part being further configured to receive electronic requests for attraction access, each request relating to a respective access key and being for the at least one user associated with the access key to access an attraction from the one or more attractions, wherein receipt of each request causes the electronic queue management part to determine a waiting time associated with the attraction for the respective at least one user. The at least one user is allocated to a virtual queue of the at least one virtual queue associated with the attraction if the at least one user is allocated to the first group of users. The waiting time indicates a time at which the respective at least one user reaches a front of the allocated virtual queue and can access the attraction on presentation of the respective access key. The at least one user can access the attraction immediately on presentation of the respective access key if the at least one user is allocated to the second group. The electronic queue management part is further configured to prevent the at least one user from accessing further attractions during a cool down period after access to the attraction has been provided.

The queuing system further comprises an access control part, in communication with the electronic queue management part. The access control part is arranged to control access to each of the one or more attractions such that only: a user allocated to the first group presenting an access key at the determined time for accessing the respective attraction; or a user allocated to the second group presenting an access key after a request to access the attraction has been received by the electronic queue management part, is allowed to access the respective attraction, no other access to the attraction being permitted.

The at least one user may be allocated to one of the plurality of groups when the at least one user is provided with the associated access key.

The queuing system may further comprise an access key registration part, configured to record an association between each access key and the respective at least one user associated with the access key. The access key registration part may be in communication with the electronic queue management part for communication of information about an access key in respect of which a request has been received. The access key registration part may be further configured to allocate the at least one user to one of the plurality of groups.

Data indicating which of the plurality of groups the at least one user has been allocated to may be stored by: the queue manager; and/or the respective access key. The queue manager may determines how to act on the request, based on the data indicating to which group the user has been allocated. Where the data is stored by the access key, the data may be communicated to the queue manager when the one or more users makes a request to access an attraction.

At least one user may be allocated to the first group. At least one user may be allocated to the second group.

The cool down period may be determined based on the waiting time associated with the attraction (the cool down period is indicated by the waiting time). In other words, the time that a user in the first group has to wait before they are able to access the attraction may be the same as the cool down period for a user in the second group. In this way, the system can ensure that users in the first and second group are able to ride similar numbers of attractions during their visit.

The electronic queue management part may be further configured to select one or more users from those allocated to a first virtual queue of the one or more virtual queues. The selected one or more users may each have a respective current position or wait time in the first virtual queue. The electronic queue management part may be further configured to reallocate the selected one or more users to a reallocated position or wait time within the first virtual queue or within a second virtual queue from the one or more virtual queues.

Where the at least one user is allocated to the first group, the electronic queue management part may be further configured to indicate to the at least one user, an estimated time to reach the front of the first virtual queue or an estimated time at which the at least one user will reach the front of the first virtual queue.

Where the at least one user is allocated to the second group, the electronic queue management part may be further configured to indicate to the at least one user, a cool down time based on the estimated time to reach the front of the first virtual queue.

The electronic queue management part may be configured to manage the first virtual queue by predicting removal of or removing a number of users from the front of the queue according to a set rate.

The estimated time may be based on the set rate.

The electronic queue management part may be configured to indicate the estimated time (and/or the cool down period) to the at least one user via the access key associated with the at least one user.

The electronic queue management part may be configured to manage the first virtual queue by predicting removal of or removing a number of users from the front of the queue according to a set rate.

The electronic queue management part may be configured to determine the waiting time based on the set rate.

The set rate may be set on the basis of a proportion of an attraction throughput or capacity.

The proportion may be set on the basis of a reliability performance for the attraction.

The electronic queue management part may be configured to determine the waiting time (and/or the cool down period) based on a number of users in the first virtual queue.

The number of users in the first virtual queue may be determined by identifying the access key associated with each at least one user allocated to the first virtual queue and determining a number of users associated with each access key.

The reliability performance may be based on one or more of: a variability of throughput for the attraction; a rate of unexpected closure for the attraction; a rate of unexpected closure for one or a more other attractions.

Each of the plurality of access keys may comprise one or more of: a portable communications device (for example a mobile telephone, smartphone or pager device); a RFID device; a paper ticket.

The electronic queue management part may be configured to receive the electronic requests through a wireless interface from an access key.

The queuing system may further comprise an access barrier for each of the one or more attractions. Each access barrier may be configured to allow access by one or more users to the respective attraction on presentation of an access key associated with the one or more users at the determined time (if the one or more users are allocated to the first group) or after a request to access the attraction has been received by the electronic queue management part (if the one or more users are allocated to the second group).

Each access barrier may define a respective physical buffer queue, the physical buffer queue allowing access to the respective attraction for all users that have passed through the access barrier.

The set rate may be based on a length of the physical buffer queue of the attraction associated with the first virtual queue.

The electronic queue management part may be configured to set the cool down time of users in the second group requesting access to an attraction based on a length of the physical buffer queue of the attraction.

In another aspect, the queuing system comprises: an electronic queue management part, configured to manage at least one virtual queue in respect of the one or more attractions, the electronic queue management part being further configured to receive electronic requests for attraction access, each request relating to a respective access key and being for the at least one user associated with the access key to access an attraction from the one or more attractions, receipt of each request causing the respective at least one user to be added to the at least one virtual queue and wherein the electronic queue management part is further configured to determine a time at which the respective at least one user in respect of each request reaches a front of the at least one virtual queue and can access an attraction from the one or more attractions on presentation of the respective access key; and an access control part, in communication with the electronic queue management part and arranged to control access to the attraction such that only a user presenting an access key at the determined time for accessing the (or each) attraction is allowed to access the (respective) attraction. In particular, no other normal access to the (respective) attraction may be permitted (although access for other types of users, such as disabled users may additionally be provided). Thus, each of the at least one virtual queue may be associated with a respective attraction. Then, the at least one user to which the request relates may be allocated to a virtual queue associated with the attraction to which the request relates (there may be one or multiple virtual queues for each attraction).

This provides a complete (100%) virtual queuing system, such that no user (referred to as a guest) queues in a physical line that operates in parallel (as opposed to series) with the one or more virtual queues. This provides a large number of improved opportunities for management of the virtual queue or queues. Although as mentioned above, there may be exceptional cases (such as a disabled user) that may be able to bypass the complete virtual queue, it may be possible to accommodate even such cases in the virtual queue. For example, disabled users may be managed through the system to avoid discrimination. This may further ensure that they avoid having to wait in line for long periods.

Some users may have special requirements that mean they need to bypass the virtual queue and access the attraction (or at least the physical buffer queue) immediately after requesting to access the attraction. These users may be assigned to a second group to distinguish them from users that access the attraction via the virtual queue (users allocated to a first group). Users allocated to the second group may be allowed to access attractions in a manner that is fair (and prevented from going on more than their fair share of rides) by providing a "cool down" period after each request to access an attraction is made. This system may prevent users in the second group from making a request to access another attraction until the cool down period has expired. The length of the cool down period may depend on the attraction for which access is requested. The length of the cool down period can be set in a number of ways. The required cool down period associated with an attraction may be communicated to the user at the time the reservation request to access that attraction is made.

The electronic queue management part is preferably further configured to select one or more users from those allocated to a first virtual queue of the one or more virtual queues. The selected one or more users may each have a respective current position or wait time in the first virtual queue. Then, the electronic queue management part may be further configured to reallocate the selected one or more users to a reallocated position or wait time within the first virtual queue or within a second virtual queue from the one or more virtual queues.

In the preferred embodiment, the reallocated position or wait time is either: (a) within the first virtual queue and more advanced than the current position or wait time (that is a position closer to the front and/or a shorter wait time); or (b) within a second virtual queue from the one or more virtual queues and the same or more advanced than the current position or wait time (that is a position the same distance or closer to the front and/or the same or a shorter wait time). This may allow users to be reallocated efficiently and fairly in an electronic queuing system. Optionally, the reallocated position or wait time may be less advanced (that is a position further from the front and/or a longer wait time compared with the current position or wait time) within either the first or second virtual queues. By selecting users (particularly only some of the users, as indicated below), the electronic system may be able to redistribute users to cope with unexpected events (such as a reduction in throughput or closure of an attraction) or to improve efficiency in respect of other attractions (for example, where their virtual queues do not provide sufficient users to maintain capacity). Typically, advancing the user within the queue or transferring the user to another queue either in the same or a more advanced position may be to their benefit, as it may result in shorter wait time overall until an attraction can be accessed (for instance if the attraction associated with the first virtual queue closes or suffers some throughput rate reduction). In some cases, pushing a user back in a virtual queue may be to their benefit. For example, the user may realise that they cannot make the time slot window they have been allocated and they may therefore obtain a time later than their current one. A small time slot window may help the system accuracy and may allow a user to push back and/or let the system know that they will be late.

The electronic queue management part is advantageously further configured to keep a respective current position or wait time the same for each of the users allocated to the first virtual queue that are not the selected one or more users, when the selected one or more users are reallocated to the reallocated position or wait time. Additionally or alternatively, the electronic queue management part is further configured to keep a respective current position or wait time the same for each of the users allocated to the second virtual queue that are not the selected one or more users, when the selected one or more users are reallocated to the reallocated position or wait time (particularly in the second virtual queue). In other words, only the selected user or users may be reallocated and the positions or wait times of other users may remain unaffected.

In some embodiments, the electronic queue management part is configured to select the one or more users by receiving a request from the one or more users. Then, the electronic queue management part may be further configured to reallocate the selected one or more users in response to receipt of the request. Additionally or alternatively, the electronic queue management part may be configured to offer reallocation to at least one user allocated to the first virtual queue. Then, the selected one or more users may comprise one, some or all of the at least one user offered reallocation. In that case, the electronic queue management part may be further configured to receive a request from one or more users in response to the one or more users being offered reallocation. Then, the selected one or more users may comprise one, some or all of the one or more users from whom a request is received. Thus, the electronic queue management part may be further configured to reallocate the selected one or more users in response to receipt of the request.

In some embodiments, the selected one or more users comprise a user who has (or users who have) previously been reallocated to the first virtual queue from another virtual queue. Such users may, for example, be offered the opportunity to move forward (advance) and/or be moved forward (advanced) in the first virtual queue, when they have previously been reallocated to the first virtual queue from another virtual queue, for example a virtual queue for which the associated attraction suffered a problem, such as a reduced throughput or closure.

Preferably, the electronic queue management part is configured to manage at least one virtual queue in respect each of a plurality of attractions. Thus, each attraction has one virtual queue or a plurality of virtual queues associated with it. For example, an attraction can have a primary virtual queue that might be considered a normal (stand-by) virtual queue and a secondary virtual queue that might be deemed a priority virtual queue. One advantage of this approach is that the merge point of the two queues is itself virtual. Hence, a first guest A who is in the primary virtual queue presents themselves or their group at the front at the same time as a second guest B who is in the secondary virtual queue. Neither will have any idea how long the other has waited and only one access point to the attraction is needed. This will be discussed further below. In the preferred embodiment, the electronic queue management part is configured to manage a first virtual queue in respect of a first attraction from the one or more attractions and to manage a second virtual queue in respect of a second, different attraction from the one or more attractions. Alternatively, the second virtual queue may be associated with the first attraction.

Advantageously, each of the plurality of access keys comprises one or more of: a portable communications device (for example a mobile telephone, smartphone, watch device, tablet device or similar wireless communications device); a RFID device; a paper ticket; and a biometric feature. The use of an electronic access key may have advantages. For example, the electronic queue management part may be configured to receive the electronic requests through a wireless interface from an access key. In addition or alternatively, the electronic queue management part may be configured to receive the electronic requests from a system or device that is separate to the access key (for example, a booking kiosk), but which may be able to interface with the access key to allow identification of the at least one user associated with the access key.

For users in the second group, preventing the at least one user from accessing further attractions during a cool down period may be achieved by preventing the one or more users from sending further requests from their access key or from the booking kiosk. Alternatively, the at least one user may be prevented from accessing further attractions during a cool down period by receiving requests from the one or more users at the queue manager and sending a reject or error message to the one or more users to indicate that their request for access cannot be accommodated because the cool down period is still running.

Access to the attraction is allowed at a time set by the queuing system. This time may be a time range. For example, the determined time may comprise one or both of: an earliest time at which the at least one user can access the attraction; and a latest time at which the at least one user can access the attraction.

Beneficially, the access control part comprises an access barrier for each of the one or more attractions. The access barrier may be configured to allow access by one or more users to the attraction on presentation of an access key associated with the one or more users at the determined time. For example, the access barrier may comprise a sensor configured to detect the access key (for example, by means of a wireless or RFID link, by means of a barcode, QR code or other coding on paper or electronic format or by biometric recognition). In some embodiments, the access barrier defines a physical buffer queue (for instance, the entry point of the physical buffer queue, which then extends to the attraction). The physical buffer queue may allow access to the attraction for all users that have passed through the access barrier. Multiple physical buffer queues per attraction may be provided. It should be noted that the physical buffer queue is in series (not parallel) with the at least one virtual queue managed by the electronic queue management part. For users allocated to the first group, entry to a physical buffer queue is allowed only after reaching a front of the at least one virtual queue. For users allocated to the second group, entry to a physical buffer queue is permitted immediately after a request for attraction access has been received by the electronic queue manager. The one or more users must then wait for a cool down period before they can send further requests for attraction access.

A change in the rate of throughput of an attraction (the throughput rate change), for example, closure (which may be unexpected) or throughput delay of an attraction may cause the at least one virtual queue and/or any physical buffer queue to become long and may result in a poor experience for users. Preferably, the electronic queue management part is further configured to detect a closure (typically unexpected) or throughput delay of an attraction (for example, by the provision of external information or by a sensor) and to allocate a user either in the at least one virtual queue or in the physical buffer queue (which may also be deemed part of a virtual queue) for the attraction to another attraction. As discussed above, this may be done by request of the user (by means of the respective access key, for instance) or automatically without request, for instance based on other criteria such as current time, time waited or a probability of reopening or increased throughput of the ride. Additionally or alternatively, the replacement attraction may be specified by the system or selected by the user from a plurality of attractions offered by the system. More preferably, the electronic queue management part is further configured to allocate the user in the at least one virtual queue or physical buffer queue for the attraction to another attraction with a priority setting. The advantage of a priority setting is discussed below.

If an attraction breaks down, users that have already passed the access barrier may be required to leave the buffer queue. Users allocated to the first group may be allowed to join a virtual queue for a different attraction with a priority setting or at an advanced position in the queue (taking into account the time they have already waited), for example. Alternatively, they may be allowed to enter the buffer queue for a different attraction, without needing to reach the front of the respective virtual queue. Users allocated to the second group may have their cool down period cancelled so that they can make a reservation for a different attraction straight away.

Registration of the access key may allow the electronic queue management part to associate it with one or more users. In some embodiments, the queuing system may further comprise an access key registration part, configured to record an association between each access key and the respective at least one users associated with the access key. The access key registration part may be in communication with the electronic queue management part for communication of information about an access key in respect of which a request has been received.

Different types of virtual queue may be managed by the queuing system. For example, the electronic queue management part is optionally configured to manage each of the at least one virtual queue according to a predetermined wait time (variable throughput) or a predetermined throughput (variable wait time). The predetermined wait time or a predetermined throughput may be fixed or variable. In some embodiments, the electronic queue management part is configured to manage a virtual queue from the at least one virtual queue in the form of a queue sequence. However, alternatives to a queue sequence are possible. For instance, the virtual queue may be a statistical spread of users based on their request time and the attraction throughput, such as the system described in U.S. Pat. No. 8,606,605.

The electronic queue management part may be configured to reallocate the user within the at least one virtual queue to another attraction in response to receipt of a request to switch. For example, the electronic queue management part may be configured to reallocate the user within the at least one virtual queue to another attraction such that the reallocated position or wait time of the user remains the same. Thus, reallocation may cause no additional wait time for the user or users until they are able to access an attraction.

Advantageously, the electronic queue management part is configured to manage the at least one virtual queue by predicting removal of or removing a number of users from a front of the queue according to a set rate (for example, a number of users per unit of time, such as a minute). This may be a predicted removal in the sense that an estimated wait time or attraction access time for one or more users may be based on the rate of predicted removal, although the actual rate of removal may depend on the rate at which users access the attraction or enter a physical buffer queue preceding the attraction access. The electronic queue management part is further configured to identify a throughput parameter of the attraction associated with the at least one virtual queue and to adjust each virtual queue, especially the first virtual queue, in accordance with the determined throughput parameter. The identified throughput parameter of the attraction associated with the virtual queue may comprise one of more of: a throughput rate of the attraction associated with the virtual queue; a change in throughput rate of the attraction associated with the virtual queue; a rate of change in the throughput rate of the attraction associated with the virtual queue. In particular, the electronic queue management part may be configured to manage a virtual queue (such as the first virtual queue) by predicting removal of or removing a number of users from the front of the virtual queue according to a set rate and to adjust the set rate based on the determined throughput parameter of the attraction associated with the virtual queue. The electronic queue management part may be configured to determine the time for the at least one user to access the attraction in response to the removal of the at least one user from the at least one virtual queue, for example if the users are removed from the front of the queue according to a set rate.

The electronic queue management part is beneficially configured to identify a decrease in the throughput rate of the attraction associated with a virtual queue, such as the first virtual queue. It may then be configured to inform the at least one user in the virtual queue in response to the identification. Informing the at least one user in the virtual queue if the throughput rate change is a decrease in the throughput rate may comprise offering to reallocate the at least one user to the second attraction. Such an offer may be an invitation for reallocation, as discussed above.

The rate of removal or predicted rate of removal from the front of the at least one virtual queue may be set according to different criteria. For example, the rate may be set on the basis of a number of users associated with a single access key in the virtual queue. This may allow multiple users associated with a single access key to access the attraction at the same time. The increase or decrease in predicted or actual removal rate may be offset by a corresponding decrease or increase in removal rate at a later time. Additionally or alternatively, the rate may be set on the basis of proportion (which may be 100% or less) of an attraction throughput or capacity. Advantageously, the proportion is less than 100% or no more than 95%, 90%, 80% or 75%. Reducing the proportion to less than 100% may mitigate any problems due to the actual throughput of the attraction varying. The proportion is optionally set on the basis of a reliability performance for the attraction. The reliability performance may be based on one or more of: a variability of throughput for the attraction; a rate of unexpected closure for the attraction; a rate of unexpected closure for one or a more other attractions.

In another option (which may be combined with others), the rate (predicted or actual) is set on the basis of a length of the physical buffer queue. In addition or alternatively, the rate may be set on the basis of a rate of change for the physical buffer queue length. Optionally, the length of the physical buffer queue is used to determine whether one or more users are moved around in the at least one virtual queue, for example offered immediate access to the attraction or physical buffer queue if the physical buffer queue is too short or their reservation may be delayed in time if the physical buffer queue is too long.

In some embodiments, the queuing system further comprises a sensor, configured to measure or estimate throughput for the attraction over time, the rate being set based on the measured or estimated throughput. The throughput can be defined (and therefore measured or estimated) in a variety of ways, for example, in terms of: a number of users accessing the attraction per time interval; and/or the time taken by a user to advance a set length in a virtual queue and/or a physical buffer queue.

Preferably, the electronic queue management part is further configured to indicate to the user (optionally, via the access key) an estimated time to reach (or a time at which the user will reach) the front of the at least one virtual queue (such as the first virtual queue). The electronic queue management may be configured to indicate the estimated time to the at least one user via the access key associated with the at least one user.

The estimated time may be based on the set rate of predicted or actual removal. Beneficially, the electronic queue management part is further configured to update the estimated time at each of a plurality of times (for example, at regular intervals and/or based on another event, such as removal of users from the virtual queue) and to indicate the updated estimated time to the user.

This indication may be useful to the user generally, but it may also allow further interaction between the user and the queuing system. For example, the electronic queue management part may be further configured to receive a reject instruction from the user (such as from the access key) in response to the indication of the updated estimated time (especially if the estimated time for at least one user associated with an access key is updated to an earlier time from a later time and/or if the estimated wait time for the at least one user is updated to a shorter time from a longer previous time). Then, the electronic queue management part may be further configured to cause the estimated time to change back to the later time in response to the reject instruction. The reject instruction may be sent by the at least one user via the associated access key. A user or users selected for reallocation may comprise one, some or all of the user or users from which a reject instruction is not received. Alternatively, one or more users may provide an approve instruction (via their access key) and the electronic queue management part may be configured to receive this. Then, a user or users selected for reallocation may comprise one, some or all of the user or users from which an approve instruction is received.

In some cases, the reliability of the attraction may be greater than expected. The actual throughput for the attraction may be greater than the set rate of predicted or actual removal from the front of a virtual queue (or the sum of the rates for multiple virtual queues) associated with the attraction. In this case, a request may be made to one or more selected users as to whether they wish to bring their time forward (they can decline if, for example, they are already busy, such as having lunch or another ride). Alternatively, they can be pushed back, but given the opportunity to transfer to a different attraction rather than having to wait longer. As noted above, closure or delays on the attraction may cause problems. Preferably, the electronic queue management part is further configured to detect a closure (planned or unexpected) or throughput delay of an attraction and to adjust the at least one virtual queue in respect of the attraction accordingly. The electronic queue management part may then be further configured to inform a user in the at least one virtual queue in respect of the attraction of the closure or throughput delay.

The electronic queue management part may be configured to invite the user to switch to another attraction in response to the indicated estimated time or the information or closure or delay. The electronic queue management part may be further configured to receive a request from the user to switch to another attraction in response to the indicated estimated time and/or information (and/or invitation). Then, electronic queue management part may be further configured to reallocate the user within the at least one virtual queue to another attraction in response to receipt of the request to switch. For example, the electronic queue management part may be configured to reallocate the user within the at least one virtual queue to another attraction such that the reallocated position or wait time of the user remains the same. Thus, reallocation may cause no additional wait time for the user or users until they are able to access an attraction.

The virtual queue may be managed in various ways. Priority management is a desirable part of the queuing system. In embodiments, the electronic queue management part is configured to determine that at least one user has a priority setting, thereby causing the position of the user in the at least one virtual queue to move forward at a faster rate than other users in the at least one virtual queue. Additionally or alternatively, the electronic queue management part is further configured to receive a freeze request in respect of at least one user in the at least one virtual queue causing the at least one user's position in the at least one virtual queue to be fixed, with all other users' positions in the at least one virtual queue changing around the at least one user's fixed position. Then, the electronic queue management part may be further configured to receive an unfreeze request in respect of at least one user having a fixed position in the at least one virtual queue, thereby causing the at least one user's position in the at least one virtual queue to be variable.

In some embodiments, the at least one virtual queue comprises a first virtual queue having a first rate of predicted removal or removal from the front of the first virtual queue to access an attraction and a second virtual queue having a second rate of predicted removal or removal from the front of the second virtual queue to access the attraction. Advantageously, the first and second virtual queues are managed in parallel by the electronic queue management part. This may allow users with a priority setting to be placed in a specific one of the two virtual queues, for example the second virtual queue. Beneficially, the electronic queue management part is further configured to control the addition of users to the first and second virtual queues and/or the first and second rates of predicted removal or removal, such that an average wait time for a user in the second virtual queue is less than an average wait time for a user in the first virtual queue. Thus, the second virtual queue may be used for users with a priority setting.

In another aspect, a method of managing a queuing system for controlling access by a plurality of users to one or more attractions is provided. The plurality of users having a plurality of access keys, each access key being associated with at least one user from the plurality of users, wherein the at least one user is allocated to one of a plurality of groups, wherein the plurality of groups comprises a first group and a second group, the method comprising: receiving electronic requests for attraction access, each request relating to a respective access key and being for the at least one user associated with the access key to access an attraction from the one or more attractions; managing the one or more virtual queues in respect of the one or more attractions, each of the at least one virtual queue being associated with a respective attraction of the one or more attractions; for each request received, determining a waiting time associated with the attraction for the respective at least one user, and:

if the at least one user is allocated to the first group, adding the respective at least one user to a virtual queue associated with the respective attraction, wherein the waiting time indicates a time at which the respective at least one user in respect of each request reaches a front of the respective virtual queue and can access the attraction associated with the respective virtual queue on presentation of the respective access key, if the at least one user is allocated to the second group, preventing the at least one user from requesting to access further attractions during a cool down period after access to the attraction has been provided (or after the request to access the attraction has been received); and controlling access to the attraction such that only a user allocated to the first group presenting an access key at the determined time for accessing the attraction, or a user allocated to the second group presenting an access key after a request to access the attraction has been received by the electronic queue management part, is allowed to access the attraction, no other access to the attraction being permitted.

In another aspect, there is provided a method of managing a queuing system for controlling access by a plurality of users to one or more attractions. The plurality of users have a plurality of access keys, each access key being associated with at least one user from the plurality of users. The method comprises: receiving electronic requests for attraction access, each request relating to a respective access key and being for the at least one user associated with the access key to access an attraction from the one or more attractions; for each request received, adding the respective at least one user a virtual queue in respect of the attraction; managing the one or more virtual queues in respect of the one or more attractions (each of the at least one virtual queue being associated with a respective attraction of the one or more attractions, such that for each request received, the step of adding may comprise adding the respective at least one user to a virtual queue associated with the respective attraction); determining a time at which the respective at least one user in respect of each request reaches a front of the respective virtual queue and can access an attraction from the one or more attractions on presentation of the respective access key; and controlling access to the attraction such that only a user presenting an access key at the determined time for accessing the attraction is allowed to access the attraction, no other access to the attraction being permitted.

Preferably, the method further comprises selecting one or more users from those allocated to a first virtual queue of the one or more virtual queues, the selected one or more users each having a respective current position or wait time in the first virtual queue. Then, the method more preferably further comprises reallocating the selected one or more users to a reallocated position or wait time within the first virtual queue or within a second virtual queue from the one or more virtual queues. In the preferred embodiment, the reallocated position or wait time is either: (a) within the first virtual queue and more advanced than the current position or wait time; or (b) within a second virtual queue from the one or more virtual queues and the same or more advanced than the current position or wait time.

This method aspect may be combined with features corresponding to those described herein with reference to the queuing system. A computer program, configured to perform any method as disclosed herein when operated by a processor or (digital) logic configured to perform any method as disclosed herein are also provided as aspects. The combination of any specific features from any embodiments or aspects is also provided, even if that combination is not explicitly disclosed.

Clauses Setting Out Further Embodiments

Clause 1. A queuing system for controlling access by a plurality of users to one or more attractions, the plurality of users having a plurality of access keys, each access key being associated with at least one user from the plurality of users, the queuing system comprising:
an electronic queue management part, configured to manage at least one virtual queue, each of the at least one virtual queue being associated with a respective attraction of the one or more attractions, the electronic queue management part being further configured to receive electronic requests for attraction access, each request relating to a respective access key and being for the at least one user associated with the access key to access an attraction from the one or more attractions, receipt of each request causing the respective at least one user to be allocated to a virtual queue of the at least one virtual queue associated with the attraction and wherein the electronic queue management part is further configured to determine a time at which the respective at least one user in respect of each request reaches a front of the allocated virtual queue and can access the attraction on presentation of the respective access key; and an access control part, in communication with the electronic queue management part and arranged to control access to each of the one or more attractions such that only a user presenting an access key at the determined time for accessing the respective attraction is allowed to access the attraction, no other access to the respective attraction being permitted; and wherein the electronic queue management part is further configured to select one or more users from those allocated to a first virtual queue of the one or more virtual queues, the selected one or more users each having a respective current position or wait time in the first virtual queue, the electronic queue management part being further configured to reallocate the selected one or more users to a reallocated position or wait time within the first virtual queue or within a second virtual queue from the one or more virtual queues.

Clause 2. The queuing system of clause 1, wherein the reallocated position or wait time is either: (a) within the first virtual queue and more advanced than the current position or wait time; or (b) within a second virtual queue from the one or more virtual queues and the same or more advanced than the current position or wait time.

Clause 3. The queuing system of clause 1 or clause 2, wherein the electronic queue management part is further configured to keep a respective current position or wait time the same for each of the users allocated to the first virtual queue that are not the selected one or more users, when the selected one or more users are reallocated to the reallocated position or wait time.

Clause 4. The queuing system of any preceding clause, wherein the electronic queue management part is further configured to keep a respective current position or wait time the same for each of the users allocated to the second virtual queue that are not the selected one or more users, when the selected one or more users are reallocated to the reallocated position or wait time.

Clause 5. The queuing system of any preceding clause, wherein the electronic queue management part is configured to manage the first virtual queue in respect of a first attraction from the one or more attractions and to manage the second virtual queue in respect of the first attraction or a second, different attraction from the one or more attractions.

Clause 6. The queuing system of any preceding clause, wherein the electronic queue management part is further configured to select the one or more users by receiving a request from the one or more users, the electronic queue management part being further configured to reallocate the selected one or more users in response to receipt of the request.

Clause 7. The queuing system of any preceding clause, wherein the electronic queue management part is further configured to offer reallocation to at least one user allocated to the first virtual queue, the selected one or more users comprising one, some or all of the at least one user offered reallocation.

Clause 8. The queuing system of clause 7, wherein the electronic queue management part is further configured to receive a request from one or more users in response to the one or more users being offered reallocation, the selected one or more users comprising one, some or all of the one or more users from whom a request is received, the electronic queue management part being further configured to reallocate the selected one or more users in response to receipt of the request.

Clause 9. The queuing system of any preceding clause, wherein the electronic queue management part is configured to manage the first virtual queue by predicting removal of or removing a number of users from the front of the first virtual queue according to a set rate.

Clause 10. The queuing system of any preceding clause, wherein the electronic queue management part is further configured to identify a throughput parameter of the attraction associated with the first virtual queue and to adjust the first virtual queue in accordance with the determined throughput parameter.

Clause 11. The queuing system of clause 10, wherein the electronic queue management part is configured to manage the first virtual queue by predicting removal of or removing a number of users from the front of the first virtual queue according to a set rate and to adjust the set rate based on the determined throughput parameter of the attraction associated with the first virtual queue.

Clause 12. The queuing system of clause 10 or clause 11, wherein the identified throughput parameter of the attraction associated with the first virtual queue comprises one of more of: a throughput rate of the attraction associated with the first virtual queue; a change in throughput rate of the attraction associated with the first virtual queue; a rate of change in the throughput rate of the attraction associated with the first virtual queue.

Clause 13. The queuing system of clause 12, wherein the electronic queue management part is configured to identify a decrease in the throughput rate of the attraction associated with the first virtual queue and to inform the at least one user in the first virtual queue in response to the identification.

Clause 14. The queuing system of clause 13, wherein informing the at least one user in the first virtual queue if the throughput rate change is a decrease in the throughput rate comprises offering to reallocate the at least one user to the second attraction.

Clause 15. The queuing system of any preceding clause, wherein the electronic queue management part is further configured to indicate to the at least one user an estimated time to reach the front of the first virtual queue or an estimated time at which the at least one user will reach the front of the first virtual queue.

Clause 16. The queuing system of clause 15, wherein the electronic queue management part is configured to manage the first virtual queue by predicting removal of or removing a number of users from the front of the queue according to a set rate, and wherein the estimated time is based on the set rate.

Clause 17. The queuing system of clause 15 or clause 16, wherein the electronic queue management is configured to indicate the estimated time to the at least one user via the access key associated with the at least one user.

Clause 18. The queuing system of any preceding clause, wherein the electronic queue management part is further configured to update the estimated time at each of a plurality of times and to indicate the updated estimated time to the user.

Clause 19. The queuing system of clause 18, wherein the electronic queue management part is further configured to receive a reject instruction from the at least one user in response to the indication of the updated estimated time, if the estimated time for the at least one user is updated to a shorter time from a longer previous time or to an earlier time from a later previous time, and to cause the estimated time to change back to the previous time in response to the reject instruction.

Clause 20. The queuing system of clause 19, wherein the reject instruction is sent by the at least one user via the associated access key.

Clause 21. The queuing system of clause 19 or clause 20, wherein the selected one or more users comprise one, some or all of the user or users from which a reject instruction is not received.

Clause 22. The queuing system of any preceding clause, wherein the selected one or more users comprise a user who has previously been reallocated to the first virtual queue from another virtual queue.

Clause 23. The queuing system of any preceding clause, wherein the electronic queue management part is configured to manage the first virtual queue by predicting removal of or removing a number of users from the front of the queue according to a set rate and wherein the electronic queue management part is configured to determine the time at which the at least one user can access the attraction based on the set rate.

Clause 24. The queuing system of any preceding clause, wherein the electronic queue management part is configured to manage the first virtual queue by predicting removal of or removing a number of users from the front of the queue according to a set rate, and wherein the set rate is determined on the basis of a number of users associated with a single access key in the virtual queue.

Clause 25. The queuing system of any preceding clause, wherein the electronic queue management part is configured to manage the first virtual queue by predicting removal of or removing a number of users from the front of the queue according to a set rate, and wherein the rate is set on the basis of proportion of an attraction throughput or capacity.

Clause 26. The queuing system of clause 25, wherein the proportion is set on the basis of a reliability performance for the attraction.

Clause 27. The queuing system of clause 26, wherein the reliability performance is based on one or more of: a variability of throughput for the attraction; a rate of unexpected closure for the attraction; a rate of unexpected closure for one or a more other attractions.

Clause 28. The queuing system of any preceding clause, further comprising:
a sensor, configured to measure or estimate throughput for the attraction over time.

Clause 29. The queuing system of clause 28, wherein the electronic queue management part is configured to manage the first virtual queue by predicting removal of or removing a number of users from the front of the queue according to a set rate and the set rate is based on the measured or estimated throughput.

Clause 30. The queuing system of any preceding clause, wherein each of the plurality of access keys comprises one or more of: a portable communications device (for example a mobile telephone, smartphone or pager device); a RFID device; a paper ticket.

Clause 31. The queuing system of any preceding clause, wherein the electronic queue management part is configured to receive the electronic requests through a wireless interface from an access key.

Clause 32. The queuing system of any preceding clause, wherein the determined time comprises one or both of: an earliest time at which the at least one user can access the attraction; and a latest time at which the at least one user can access the attraction.

Clause 33. The queuing system of any preceding clause, further comprising:
an access barrier for each of the one or more attractions, the access barrier being configured to allow access by one or more users to the respective attraction on presentation of an access key associated with the one or more users at the determined time.

Clause 34. The queuing system of clause 33, wherein each access barrier defines a respective physical buffer queue, the physical buffer queue allowing access to the respective attraction for all users that have passed through the access barrier.

Clause 35. The queuing system of clause 34, wherein the electronic queue management part is configured to manage the first virtual queue by predicting removal of or removing a number of users from the front of the first virtual queue according to a set rate, and wherein the set rate is based on a length of the physical buffer queue of the attraction associated with the first virtual queue.

Clause 36. The queuing system of clause 34 or clause 35, wherein the electronic queue management part is further configured to detect a closure of the attraction associated with the first virtual queue and to select one or more users in the physical buffer queue for reallocation to a virtual queue associated with another attraction.

Clause 37. The queuing system of clause 36, wherein the electronic queue management part is further configured to allocate the user in the physical buffer queue for the attraction to another attraction with a priority setting.

Clause 38. The queuing system of any preceding clause, further comprising:
an access key registration part, configured to record an association between each access key and the respective at least one user associated with the access key, the access key registration part being in communication with the electronic queue management part for communication of information about an access key in respect of which a request has been received.

Clause 39. The queuing system of any preceding clause, wherein the electronic queue management part is configured to manage each of the at least one virtual queue according to respective predetermined wait times or respective predetermined throughputs.

Clause 40. The queuing system of any preceding clause, wherein the electronic queue management part is configured to manage a virtual queue from the at least one virtual queue in the form of a queue sequence.

Clause 41. The queuing system of any preceding clause, wherein the electronic queue management part is configured to determine that at least one user has a priority setting, thereby causing the position of the user in a virtual queue of the at least one virtual queue to move forward at a faster rate than other users in the virtual queue.

Clause 42. The queuing system of any preceding clause, wherein the electronic queue management part is further configured to receive a freeze request in respect of at least one user in a virtual queue of the at least one virtual queue causing the at least one user's position in the virtual queue to be fixed, with all other users' positions in the virtual queue changing around the at least one user's fixed position.

Clause 43. The queuing system of clause 42, wherein the electronic queue management part is further configured to receive an unfreeze request in respect of at least one user having a fixed position in the virtual queue, thereby causing the at least one user's position in the virtual queue to be variable.

Clause 44. The queuing system of any preceding clause, wherein the first virtual queue has a first rate of predicting removal or removal from the front of the first virtual queue to access the attraction associated with the first virtual queue and a second virtual queue has a second rate of predicting removal or removal from the front of the second virtual queue to access the attraction associated with the second virtual queue, the first and second virtual queues being managed in parallel by the electronic queue management part.

Clause 45. The queuing system of clause 44, wherein the electronic queue management part is further configured to control the addition of users to the first and second virtual queues and the first and second rates of predicting removal or removal, such that an average wait time for a user in the second virtual queue is less than an average wait time for a user in the first virtual queue.

Clause 46. A method of managing a queuing system for controlling access by a plurality of users to one or more attractions, the plurality of users having a plurality of access keys, each access key being associated with at least one user from the plurality of users, the method comprising:

receiving electronic requests for attraction access, each request relating to a respective access key and being for the at least one user associated with the access key to access an attraction from the one or more attractions;

managing the one or more virtual queues in respect of the one or more attractions, each of the at least one virtual queue being associated with a respective attraction of the one or more attractions;

for each request received, adding the respective at least one user to a virtual queue associated with the respective attraction;

determining a time at which the respective at least one user in respect of each request reaches a front of the respective virtual queue and can access the attraction associated with the respective virtual queue on presentation of the respective access key; and controlling access to the attraction such that only a user presenting an access key at the determined time for accessing the attraction is allowed to access the attraction, no other access to the attraction being permitted;

selecting one or more users from those allocated to a first virtual queue of the one or more virtual queues, the selected one or more users each having a respective current position or wait time in the first virtual queue; and reallocating the selected one or more users to a reallocated position or wait time within the first virtual queue or within a second virtual queue from the one or more virtual queues.

BRIEF DESCRIPTION OF THE DRAWINGS

The invention may be put into practice in a number of ways, and a preferred embodiment will now be described by way of example only and with reference to the accompanying drawings, in which.

DETAILED DESCRIPTION OF A PREFERRED EMBODIMENT

Figure 1:
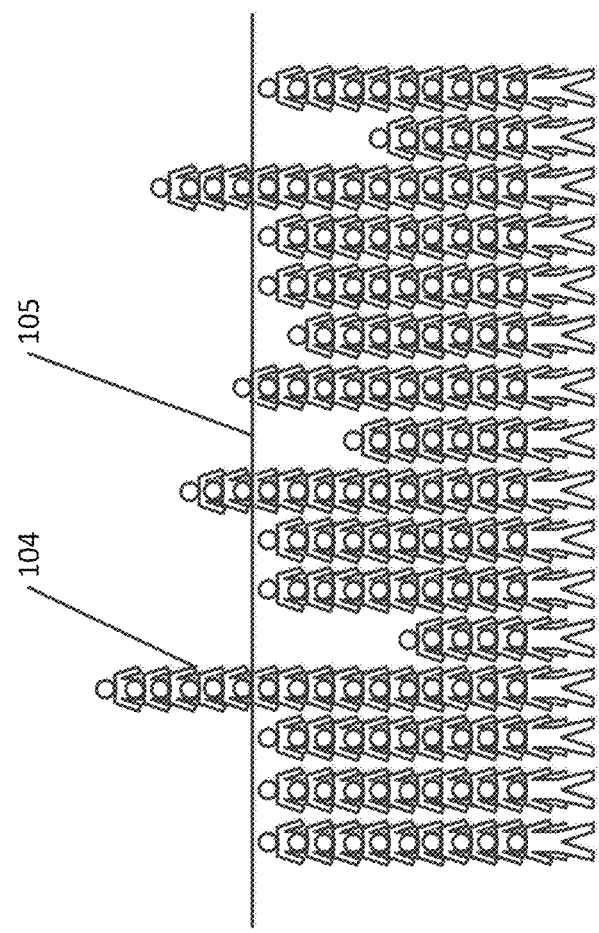
FIG. 1 shows a schematic allocation of guests in a virtual queue.
Figure 1:
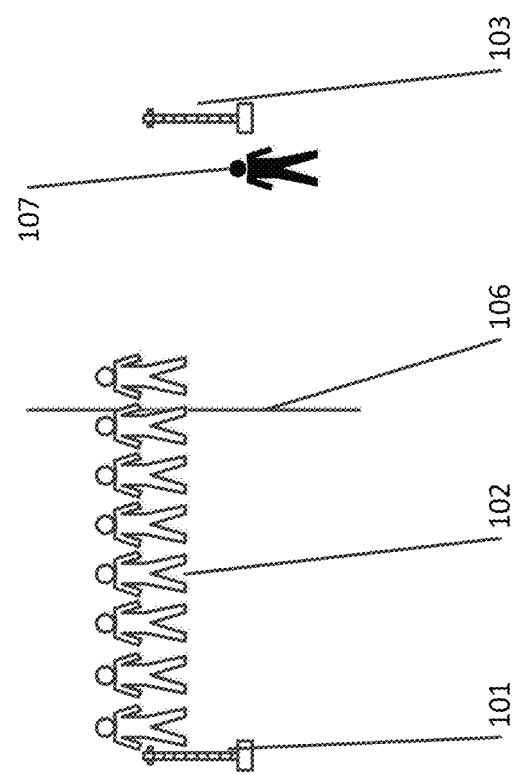

With reference to FIG. 1, a schematic representing an allocation of guests (interchangeably referred to as users) in a virtual queue according to an embodiment is shown. The system includes an attraction entry point 101, a buffer queue 102, a barrier for entry to the buffer queue 103, and at least one virtual queue 104.

When a guest makes a reservation (the process for doing which will be explained below), they will be entered into a virtual queue 104. The throughput of the virtual queue (the number of guests per unit in time) will be determined by parameters in the system and will be arranged to have an average throughput 105. This is also set as a parameter of the queue and is, for example, a percentage of the maximum throughput of the ride. Guests are shown their reservation time either on their portable communication device or at a kiosk.

The guests in the queue may be moved around if necessary by the system as they can be waiting anywhere (for example in an amusement park, other enclosure of attractions, village, town, city or wider area), they may be allocated a new reservation time or prompted to select one, based on various events.

Users are allocated into groups and the method by which the users are able to access the attraction is different depending on the group to which the users have been allocated. Users allocated to the first group access the attraction by making a reservation, entering a virtual queue and gaining access to the attraction when they have reached a front of the virtual queue. A second group of users are permitted to access the attraction immediately but may not make reservations for any further attractions until they have waited a cool down period after accessing the attraction (or after making the previous reservation).

This system of Reverse Queueing may be useful for guests who may have difficulty understanding the concept of standard queueing. This may be also be relevant for guests who may change their mind multiple times on what ride they want to go on while they are waiting in a standard virtual queue. In particular, the system may be useful for guests who are on the autistic spectrum or groups containing one or more guests who are on the autistic spectrum. Of course, this is only one example and guests may benefit from reverse queuing for a number of reasons.

This system provides guests with the option to access an attraction immediately, without the need to wait to access the attraction. The addition of the cool down period effectively prevents the guest from being able to go on more than their fair share of rides in any given visit. In this way, the process of queuing for the attraction is performed after access to the attraction has already been provided.

Each access key may be allocated to a single user or may be allocated to a plurality of users. Where an access key is allocated to a plurality of users, all users in the plurality are allocated to the same group. This allows the system to permit each member of the plurality of users to the attraction at the same time, on presentation of the access key.

The majority of users in the park are allocated to the first group and their allotted time will be after they have reached the front of the virtual queue. In the case of users allocated to the second group, the guest's allotted time is immediately after making the reservation.

At their allotted time, the guest presents themselves with an access key or device, which may be a mobile telephone, smartphone, RFID device (such as a card, wristband or other wearable item), a card or wearable item (such as a wristband) with a visual code (such as a barcode), paper ticket, body part (for biometric identification) or other device showing that they can access the attraction, at the barrier for entry to the buffer queue. The barrier 103 may be automatic or manual. They then wait in a short buffer queue 102 to get onto the attraction through the attraction entry point 101.

In cases where the buffer queue 102 is not necessary, the barrier 103 and the attraction entry point 101 will be one and the same.

The buffer queue 102 has an optimum length 106. Changes in the length of the buffer queue from this optimum are signalled back to the system, either through automatic sensing apparatus or via an attendant 107.

The queue or queues in which guests are placed (if they are allocated to the first group), prior to being granted access to the buffer queue (through the entry barrier 103), is/are managed by the queue manager, which is an electronic (computerised) system. These queues are entirely virtual queues. Advantageously, this allows guests to queue for an attraction without having to physically stand in a line. There may be different types of virtual queue, as will be discussed below. Although the queue manager may also manage the physical buffer queue 102, access to this is only available through the virtual queues.

This system will support a park, for example, where there are a number of rides or other attractions. One or more of the available attractions may be managed by the queuing system. The system supports different queue types, for instance:
  where the throughput of the ride is fixed, so the length of queue is a function of the number of guests waiting in that queue; and
  where the wait time in the queue is fixed, so the throughput of the queue varies and is a function of the number of guests in the queue (any variation in the queue throughput can taken up with a variation in the physical buffer queue 102, for example).

Other types of queue, such as where the throughput and/or wait time are variable are also possible.

Where a user has been allocated to the second group, they are preferably able to access an attraction immediately (or allowed to access the buffer queue immediately). However, there may be some attractions where immediate access is not possible. For example, this may be because the attraction is only scheduled to run once per hour. In these cases, the one or more users are preferably provided with an allotted time at the next available opportunity to access the attraction. The cool down period may be adjusted accordingly if the guest is required to wait before accessing the attraction.

A purpose of the buffer queue 102 is to allow optimum loading on attractions where there is a fixed number of spaces available (such as an amusement park ride). For attractions where there is some flexibility in the throughput (for example, a museum or walk-through attraction) this buffer queue 102 may not be necessary. The optimum length of this buffer queue 102 can be set in the system. This may be different for each ride.

Figure 2:
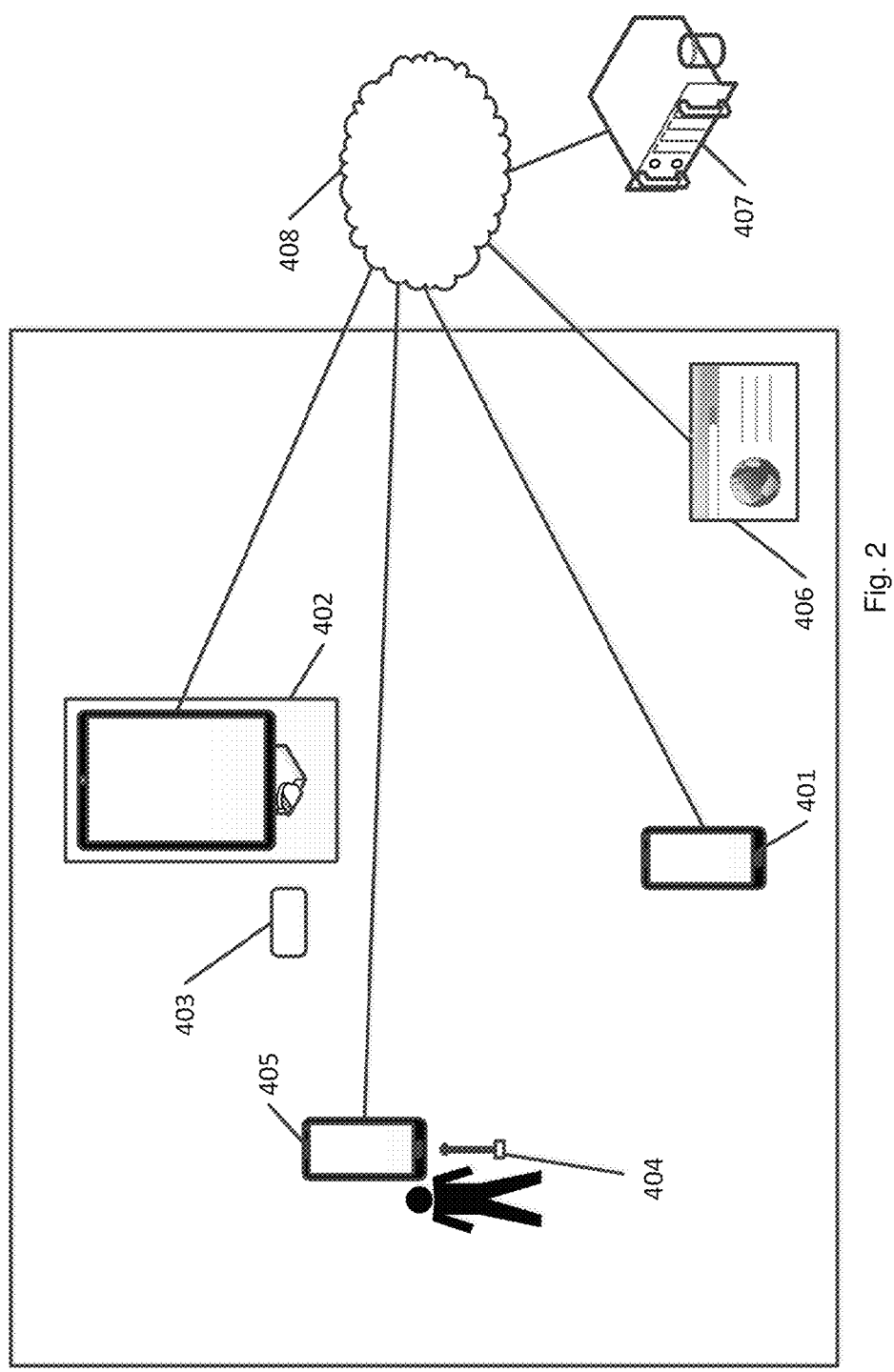
FIG. 2 schematically illustrates interactions between user devices and a system operated in accordance with the disclosure.

Referring next to FIG. 2, there are schematically illustrated interactions between user devices and a system operated in accordance with the disclosure. In this embodiment, there are provided: a smartphone access key 401; a kiosk 402; an alternative access key 403; an access barrier 404; a scanning device 405; a management console 406; an electronic queue management (computer) server (also referred to as a system) 407. A communications network (or connectivity) 408 provides connectivity between the various components of the system. The management console 406 may be used by the operator of the attraction or attractions to configure the server 407 appropriately.

To use the system the guest first registers, which can be done using a personal communications device 401 (such as a mobile telephone) or at a kiosk 402. For a premium system this will include payment of the premium service level fee. For a system where all guests are required to use the system to book, a method of permitting that each guest only appears once is required. Typically this will be based on the entry ticket, where the ticket has a unique identifier for that guest or group. The system will allow that an entry ticket may only be used for one session in a day. Multiple entry tickets will enable a guest on subsequent visits to register their session.

A form of identification links each user to a device used to interact with the system, which is typically the smartphone access key or device 401 discussed above or an alternative type of access key 403, which will be discussed below. A link to the host system to validate and verify the ticket will reduce potential fraud of guests entering invalid tickets. If this system also provides information as to whether the ticket has been used that day to gain access to the park (that is, the guest is inside the park) this will provide a further level of security. A guest may register on their personal communication device 401; alternatively they may use an alternative static form of access device 403 (such as a paper ticket with an identifier such as a barcode, QR or other visual code, an RFID device, a short range wireless communications device such as based on Bluetooth or similar technologies or biometric) and register at a kiosk 402. This may allow each user of on the system 407 to be linked to a unique identifier for the guest in the form of their access key.

To register at a kiosk 402, the user presents their access key (either the smartphone 401 or the alternative access key 403) as well as their tickets (not shown). The kiosk 402 comprises a reader for the smartphone 401 and/or the alternative access key 403. The tickets are then associated with the access key into a session.

To register on a personal communication device 401, the guest can either use the device as the access key, or associate a different access key with the session and present the tickets of the group to associate these with the session (either by scanning or typing the ticket in). This can be done directly from the personal communication device 401, in particular over a network connection.

Where the tickets have been bought online in advance, the session containing the tickets and the access key of the guest may be passed by the ticket engine to the system to pre-create these sessions. In this case, the guest identifies themselves with the system and their session is then retrieved.

The system 407 provides at least one virtual queue per attraction. However, some attractions may have multiple virtual queues. In this case, one of the virtual queues for an attraction may be considered a normal virtual queue and at least one other virtual queue for the attraction may be considered a premium virtual queue. The throughput for the normal virtual queue and the premium virtual queue for the same attraction may be different and the throughput for the premium virtual queue would normally be higher than that of the normal virtual queue.

Generally, a guest will only queue in one normal virtual queue at a time. The system may provide an enhanced service level generally through payment of a fee so that additional queue places may be added to their list. These are typically of the form of single or limited visits to an attraction, multiple attractions or faster access to one or more attractions. By providing a second virtual queue with different parameters the guest will get a time to go to the additional attraction. This will not stop them using the main system to queue and visit attractions whilst this additional entitlement remains on their list.

To make a reservation:
On a personal communication device 401 (where the guest remains logged in during the visit), they select from the options available on the screen which then communicates the preferences to the server.
OR
At a kiosk 402, the guest presents an access key in the form of a personal communication device 401, or alternative access key 403, such as an RFID device or media, a ticket or biometric information to retrieve their session details which are then presented on the kiosk 402 screen. The kiosk 402 presents the guest with options similar to the smartphone 401, enabling them to make a choice. Where appropriate, this information is then loaded onto an access key, the guest representing their access key for the system to write the information to it.

To reserve a time, a guest will be presented with a list of the attractions and the predicted ride time. When they reserve, the system will check the current queue, add them to the end of it and notify them of the actual time that has been reserved for them. The guest may be free to alter this time to be later than that supplied by the system 407. This will enable the guest to plan other events if required, especially for purchased allocation.

In addition to the reservation for attractions, additional benefits may be made available for guests to purchase, which may enable timed access to attractions. These can be individual or grouped. These may be managed by adding a separate virtual queue for the attraction.

Guests may purchase access to some of the rides in advance, allowing them to ensure that during their visit they are guaranteed a ride on those that they want. The number of rides providing this will be determined by the system setup and packages available. Users allocated to the second group may be able to purchase access to some attractions without requiring a cool down period.

Packages for reserving additional rides may be available for purchase, or for credit to the guest's session at guest services discretion. A group of rides may be available from which the guest may only be allowed on a subset.

The guest may opt to 'step out of the line' to perform certain activities; in this case their position remains fixed. This allows them to maybe use the booking engine for something different, but without having to cancel their reservation and so re-joining the line at the end. Additionally or alternatively, the system may force the guest to do so, if the guest wants to do something else (for example due to a last minute reservation for another attraction, or a longer event such as lunch, a show or similar).

During normal operation, the queue management system 407 allocates a number of guests per unit of time (for example, a minute) that the ride can accommodate, each unit of time or 'bucket' will get filled with guests, then the next bucket will be filled. If a group is larger than the bucket, then the subsequent bucket or buckets will have a corresponding number subtracted from them.

One other alternative setup for the management of this 100% virtual queue system is for attractions that need or can cope with smaller buffer queues, as will now be discussed.

The system monitors the people going through the access point, from this determines the average throughput. This will be combined with past data and smoothed to avoid large changes.

Based on this throughput the wait times are calculated for all guests in the queue. When these wait times have changed by a pre-set margin, the guest will be notified of the change.

The guest is therefore not presented with a fixed visit time, but with an estimate, which will get more accurate the nearer to the front of the queue that they get. The guest can choose to revert to their original later time if they are unable to make the new estimated time.

By setting the throughput initially as a proportion of the expected throughput the reservation time should in normal running be brought forwards. In the event of ride closures the updated reservation times will be pushed out, for extended closure the system will offer them a choice of switching to another queue.

This system copes better with low throughput attractions where the throughput is more variable, so a fixed reservation time cannot be easily provided.

Guests may be grouped into priority groups, so that higher priority groups take precedence in being moved forwards, and become the last to be moved back.

Where a user has been allocated to the second group, the system preferably estimates the waiting time, based on historical and/or real-time performance statistics. The cool down period may then be set as the best estimate of the waiting time when user makes a reservation. This period is not updated if the ride throughput changes (e.g. if the ride breaks down). The user is provided with a cool down period that is variable based on when the reservation is made, but fixed after the reservation is made.

By setting the cool down period based on the waiting time, the system is able to encourage the user allocated to the second group to access less popular attractions (where the cool down period is shorter). Advantageously, this may lead to improved utilisation of the resources in the park.

The length of the buffer queue may be controlled by adjusting the cool down period to encourage users in the second group to either join or to not join buffer queues associated with certain attractions.

When the guest arrives at the access barrier 404 at the time set by the server 407, the scanning device 405 detects the smartphone access key 401 or the alternative access key 403. The guest is allowed to pass through the access barrier 404 towards the attraction if the scanning device 405 (optionally after checking with the server 407) confirms that the guest is entitled to do so based on the time set by the server 407. The scanning device 405 may be integrated with the access barrier 404, so that the opening of the access barrier 404 is automatic. Alternatively (as shown), an attendant may be present to use the scanning device 405 and open the barrier based on the result.

The throughput of guests into the buffer queue can be adjusted so that normally it will be below the actual throughput of the ride. The factor will be determined operationally and will take into account:
- the variability of throughput of that ride;
- the propensity of the ride to break down, or other unanticipated stoppages; and/or
- the propensity of other rides within the park to break down or have stoppages (planned or unplanned) resulting in temporary closure and thus the potential need to offload guests.

To manage a line or lines efficiently, in every case where the throughput of the service or attraction can vary, the system must manage this virtual queue and keep the guest updated with their time to present themselves. This can be achieved by either moving the entry time forwards or backwards, or by sending a message to those with a personal device to determine whether they would accept a place sooner.

Figure 3:
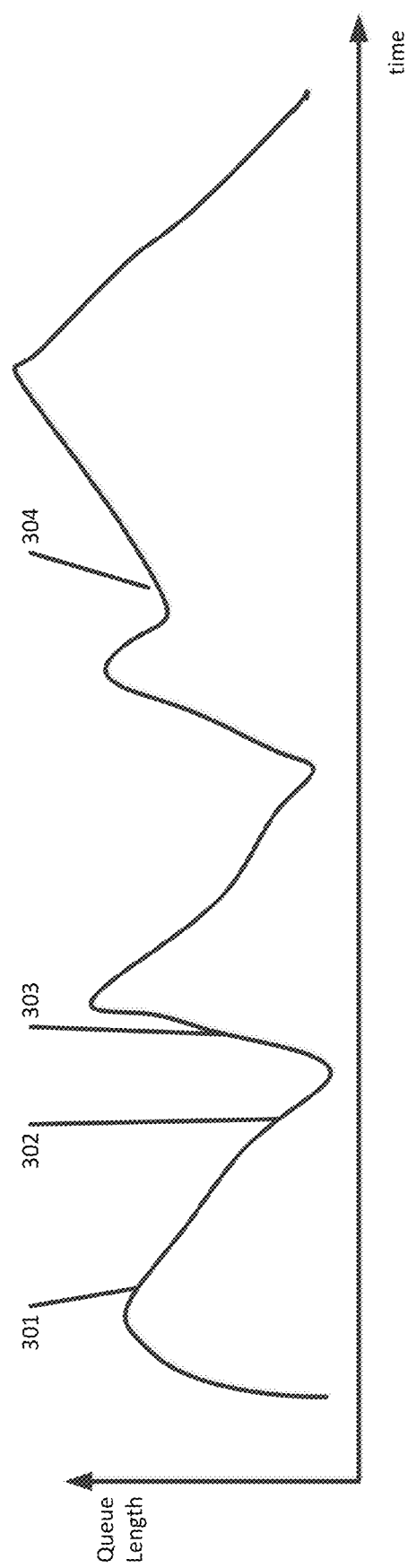
FIG. 3 shows a variation in the length of an exemplary buffer queue over time.

With reference to FIG. 3, it is shown how the length of the physical buffer queue may vary over time. The rate of throughput of the virtual queue can be set as a proportion of the expected maximum throughput of the ride. By setting the rate at less than the maximum throughput, the steady state will be for the buffer queue to decrease in length 301. When the queue gets too short, this state is signalled back to the system controller which will cause a block of guests to be granted faster access to the front of the queue through a variety of means 302. This will take a few minutes to be seen in action, and will result in the queue length increasing 303. If the attraction closes for a short period, this will result in the buffer queue increasing in length as guests are fed onto it but are not leaving onto the attraction 304, when the attraction reopens the queue will decrease once again.

To cope with the inherent unknowns of an attraction, the throughput of guests at the front of the queue can be set as a percentage of the throughput that the ride can cope with. A more unreliable ride may have a lower allocation proportion. In a steady state, the entry to the buffer queue being below the throughput of the attraction, the buffer queue will decrease in size with time.

A system to monitor this buffer queue and send back the state will enable the system to bring forward a block of guests when the ride buffer queue gets too short. This will refill the buffer queue, which will then gradually shrink through time. The guest may be prompted to decide whether they wish to advance towards the front of the queue (this may correspond to the guest being allocated an earlier reservation time). Those guests who do not want to move their place need do nothing. Optionally this method of calling forward guests can prioritise certain groups of guests, such as those nearer the front first, those who have had their records flagged with a marker as a result of ride closures or other unexpected events.

Similarly if the queue becomes too long, the system may push guests back by increasing their reservation time. In this way, the rate at which users join the buffer queue and the overall length of the buffer queue may be controlled.

Additionally or alternatively, the virtual queue can be set in the form of a fixed throughput queue.

The guest may be informed on their communication device that their reservation time is delayed. Certain types of guest (for example with pre-bought timed tickets) would potentially not be pushed back.

If the ride closes, the buffer queue will increase in length. When the ride reopens, the queue will then start to decrease again.

Thus, the rate at which users are removed from the virtual queue is the sum of: the physical rate at which they present themselves at the attraction (or its physical buffer queue) and go on to it; and the rate of those that have missed their allocated time slot and are therefore automatically removed from the queue. The predicted time given to each guest is set depending on the set rate of the virtual queue (which may be a percentage of maximum throughput of the attraction). If we expect 600 people per hour to be processed at the attraction, every minute will contain 10 people. The system can spot gaps in this (for instance, users cancelling) and fill these gaps, as explained above. This differs from existing systems, in that the number booking is known when a request is received (since the system is a complete virtual queuing approach), so a ride time is allocated based on the predicted throughput. If this throughput is changed, the system can re-allocate users by bringing them forward or moving them backwards.

Figure 4:
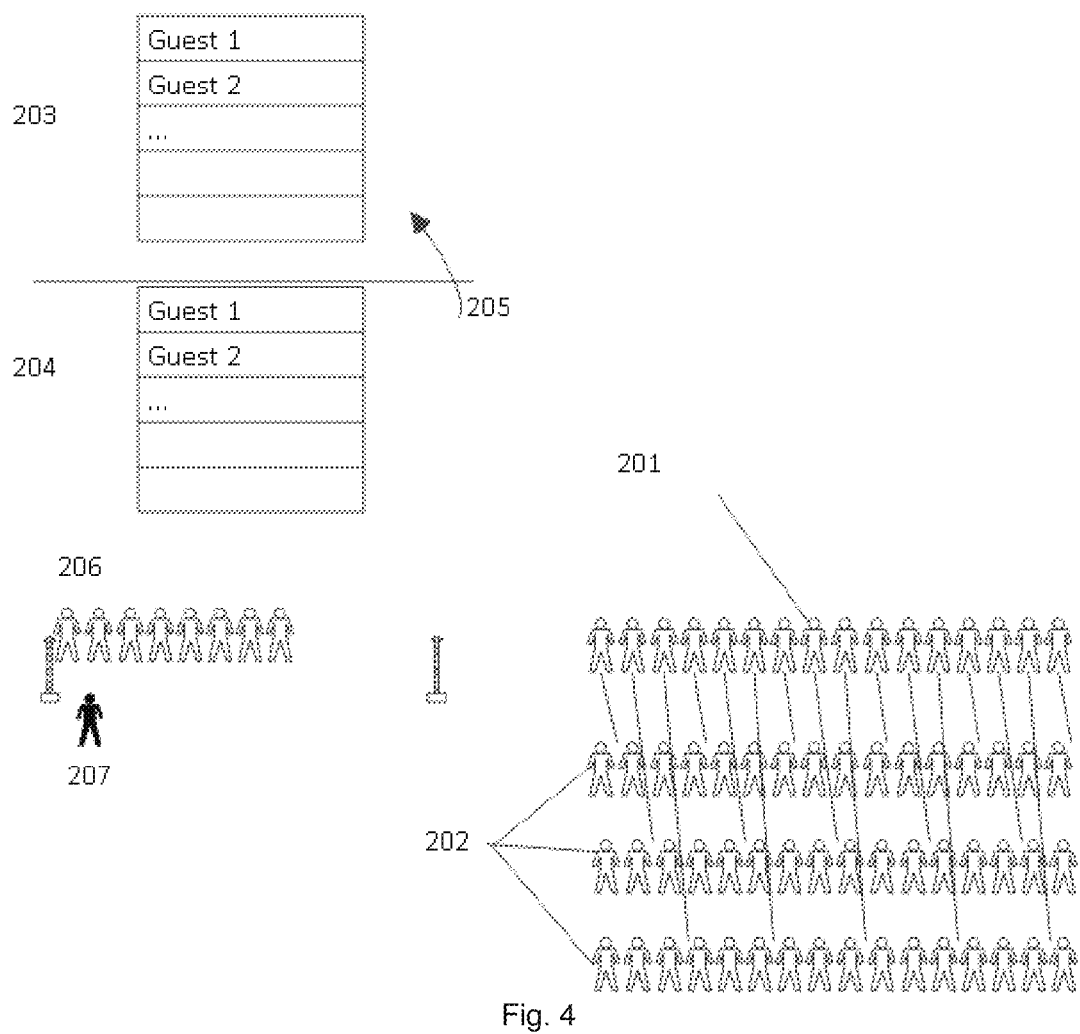
FIG. 4 depicts a schematic reallocation of guests in a buffer queue.

With reference to FIG. 4, it is demonstrated how the position of guests in a buffer queue may be reallocated. The two queues 201 and 206 are for the attraction as it is running normally. As the attendant 207 scans a group into the buffer queue 206, the system 205 removes them from the virtual queue 204 and maintains a list (access key registration record) 203 of those guests in the buffer queue 206. As there is no need to scan the guest out of the buffer queue when they get onto or into the attraction, this queue will grow, though a pruning algorithm would keep it at say 10 times the expected length, to avoid it getting too long.

If the ride breaks down (or the wait time increases for any other reason), the guests in the virtual queue 201 can be provided a choice of other attractions 202 that they may rebook on. The list of guests is held in the virtual queue 204. The wait time associated with each guest on the new ride would be configurable. Options for this would include but not be limited to the time that they have already waited subtracted from the length of the virtual queue that they are joining (either current length or the length at the time they originally reserved on the closed ride), or the time that they have yet to wait for the closed attraction. The system will track the number of guests allocated onto each ride to ensure that any one ride does not get too many. Another option is that the guest will be allocated an immediate access pass for the closed ride when it reopens, and are then free to book on another ride normally.

The attendant 207 will then scan the front of buffer queue 206, this will determine the head of the queue in the list 203, all guests after this point in the buffer queue can then be allocated a premium pass or similar for another ride. If there are multiple points that may be the head of the queue (e.g. a train that loads both sides) then the attendant will scan all possible heads and the system will then determine the list based on this.

A ride may close for a number of reasons and with subsequently different closure lengths. For scheduled stoppages (addition of a second or subsequent train for example) may be entered into the system beforehand, the system will then cause a gap in guests arriving to cater for this temporary stoppage. The throughput will then be adjusted accordingly after this stoppage so that a potentially different throughput of guests can then be accommodated.

For unexpected stoppages of short duration (e.g. ride cleaning), the buffer queue will grow during the stoppage, the system may attempt to push back some guests in the virtual queue. If guests are not delayed, then the buffer queue will grow in length. Since the throughput onto the buffer queue is set to be lower than the ride throughput, once the ride restarts the buffer queue will start to shrink.

For unexpected stoppages of a longer expected or unknown duration, the guests in the virtual queue may be reallocated by the system into queues for other rides (the group rides would be pre-set or set by an operator when the ride is marked as closed). Their new wait time may be set as the amount of time that they still have left to wait, or subtracting the amount of time that they have waited from the queue length of the new ride (either current or the length at the time that they reserved). The guests who have already scanned into a buffer queue will be out of the virtual queue. If there is no barrier for them to scan to get on the attraction then the system will keep a list of guests who have scanned in. The operator can then go to the guest at the front of the buffer queue (or multiple guests in the case of parallel loading) and scan their devices. The system may then assume that all guests after those scanned are in the buffer queue can then be immediately credited with a priority voucher within the system.

Enforcing a time limit on the window for the guest to 'check in' at the front of the line, the system can reduce the possible surges made by guests delaying their entry (lunch, another performance etc.) the guest in this case will be required to notify the server that they cannot arrive within their allotted window and select a later time when they will be able to arrive.

Guests in the second group may access the buffer queue immediately after registering to access the attraction. However, there may be some delay before the user (or users) presents themselves at the attraction (e.g. because of walking time to get to the entrance of the buffer queue). The cool down period may run from when the user makes the reservation or may run from when the user presents themselves at the access barrier. In the case where the period runs from when the user passes the access barrier, the user will likely not wait too long between making the reservation (registering to access the attraction) and accessing the attraction (to maximise how many rides they can go on).

In some cases, the user may only have a fixed period of time after making the reservation during which they may access the attraction. If this period expires, the reservation and cool down period may be cancelled and the user(s) may have to make another reservation.

Reducing the period between the reservation time and attraction access for users in the second group (as described above) may advantageously improve the control the queue manager has on the length of the buffer queues for the attractions. For example, the waiting time may have changed since the original reservation was made and the new reservation may have an updated cool down period based on the new waiting time. Therefore, users will join the buffer queues in a more predictable way. Moreover, the users in the second group will be making decisions on which attractions to access based on up-to-date waiting times.

Different types of reservations will be treated in a priority order for this pull forward or push back—for example a timed purchased ticket will be pushed back after a non-purchased reservation.

A line closure will have the same effect (pre-empting the signalling of the buffer queue becoming too long).

When a ride closes the guests can be proactively managed, and reassigned (with the guest getting a choice) into virtual queues on the remaining rides. Those in the buffer queue can be credited with an immediate (front of line) pass to use elsewhere, removing some of the customer complaints and the need for the guest to complain to guest services to get some form of recompense.

Figure 5:
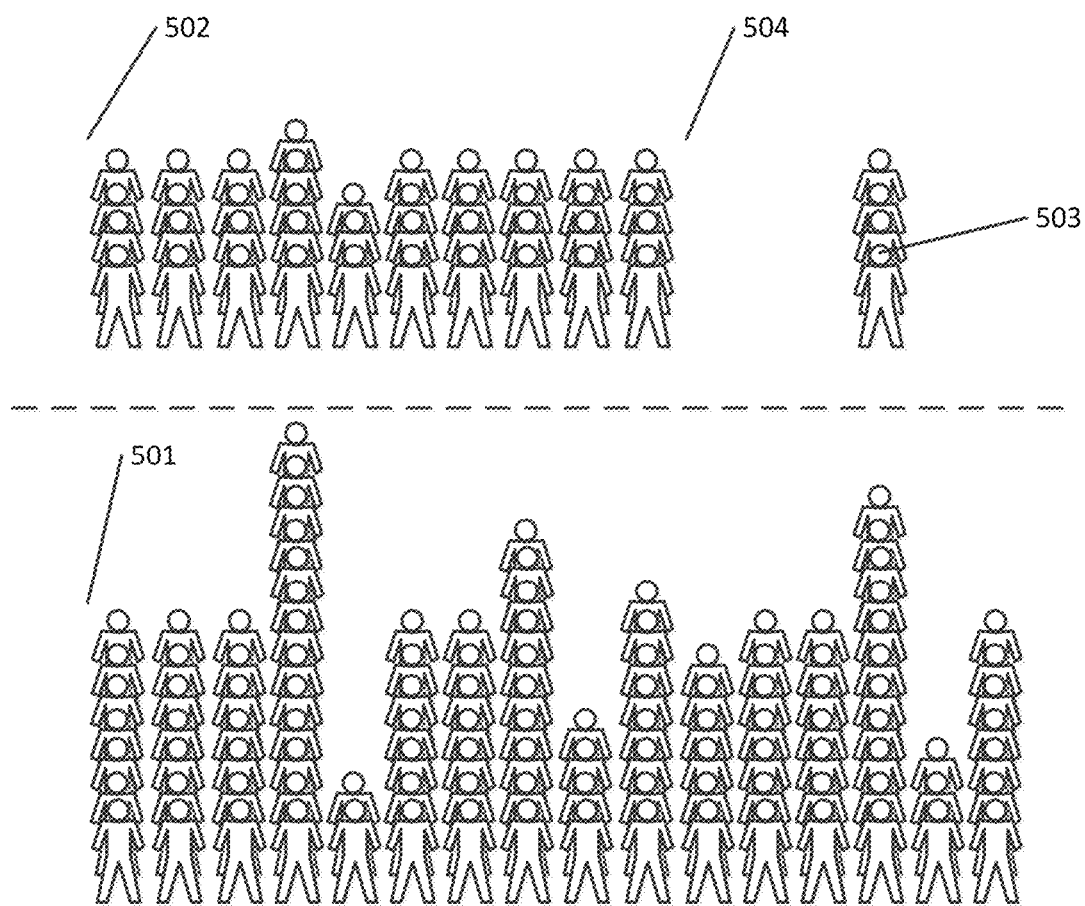
FIG. 5 shows a schematic allocation of guests in a system with multiple virtual queues.

With reference to FIG. 5, it is demonstrated how a queuing system according to embodiments of the present invention may be operated with multiple virtual queues in parallel. When the system manages 100% of the line, multiple queues 501, 502 may be configured whose individual throughputs will add up to the available throughput. The parameters of these queues may be set differently. In this example the second queue 502 provides a premium allocated ticket which does not count towards the guest's concurrent ride reservation limit. In this case the tail of the queue 504 is the time that is suggested to the guest when they purchase a timed reservation, though they are free to select a time later 503 if they have already planned something else at the time suggested.

Such a system may allow priority guests who have received an entitlement to the priority queue through some means, which may include paying for the entitlement, as a frequent user bonus, or being granted as a function of other parameters.

These additional queues can be run as fixed wait time queues or virtual queues where the length is dependent on the throughput allocated and the number of guests who have booked.

Each queue has separate parameters to determine the queue type as well as the throughput. Priority queuing may be sold into a second queue providing a fixed time, which allows the guest to carry on using the system for other rides.

By providing a virtual queue online, with an optional priority queue line in parallel the guest is freed from waiting in line and the merge point of the two queues is itself virtual so guest A who is in the standby line presents themselves or their group at the front at the same time as guest B who is in the priority line, neither will have any idea how long the other has waited.

Although a preferred embodiment has now been explained, the skilled person will understand that various alternatives and modifications are possible. For instance, although this system has been largely described with reference to an amusement park, it may equally be applied to other attractions or resources in which a time of access or entry may be desirable, such as a museum, a shop, an office counter, a restaurant or another appointment-based attraction or resource.

As noted above, throughput for the attraction may be measured by counting people moving through the access point. An alternative approach for measuring throughput is also considered. A wireless beacon may be placed at either end of the physical queue. Then, as a user with a wireless device that can interface with the beacon passes it, the device records the time. The device also records the time when it passes the end of the queue. It can then transmit this to a server. An advantage of this approach is that the queue ends can be moved easily and need no power or networking, which is instead reliant on the user device. The system may only need to measure a proportion of the guests rather than 100% to extract the necessary information (for instance, it may know how many have gone into the queue as they have been scanned previously).

The invention claimed is:

1. A queuing system for controlling access by a plurality of user accounts to one or more resources, the plurality of user accounts having a plurality of access keys, each access key being associated with at least one user account from the plurality of user accounts, wherein the at least one user account is allocated to one of a plurality of groups, wherein the plurality of groups comprises a first group and a second group, the queuing system comprising:
- an electronic queue management server, configured to manage at least one virtual queue, each of the at least one virtual queue being associated with a respective resource of the one or more resources, the electronic queue management server being further configured to:
  - receive, via a communications network, electronic requests for resource access, each request relating to a respective access key and being for the at least one user account associated with the access key to access a resource from the one or more resources, and
  - determine, in response to each request, a waiting time associated with the resource for the respective at least one user account, and
- a plurality of access control devices, each access control device being associated with a respective resource of the plurality of resources, wherein each access control device is in communication with the electronic queue management server and comprises an access control barrier and a sensor configured to detect an access key,
- wherein, if the at least one user account is allocated to the first group of users, the electronic queue management server is further configured to:
  - allocate the at least one user account to a virtual queue of the at least one virtual queue associated with the resource, and
  - send, via the communications network, an electronic message comprising the waiting time indicating a time at which the respective at least one user account reaches a front of the allocated virtual queue and can access the resource on presentation of the respective access key at the access control device, where the access control barrier is controlled to open on presentation of the respective access key at the access control device at or after the indicated time, and
- wherein, if the at least one user account is allocated to the second group of users, the electronic queue management server is further configured to:
  - send, via the communications network, an electronic message to the at least one user account, communicating that the at least one user account can access the resource immediately after a request to access the resource has been received by the electronic queue management server instead of allocating the at least one user account to the virtual queue associated with the resource, thereby allowing access to the resource by the at least one user account immediately after a request to access the resource has been received by the electronic queue management server on presentation of the respective access key at the access control device, where the access control barrier is controlled to open on presentation of the respective access key at the access control device after the request has been received by the electronic queue management server, and
  - prevent the at least one user account from accessing further resources during a cool down period after access to the resource has been provided; and
- wherein the access control device is arranged to control access to the respective resource such that access through the access control barrier to the resource is provided only if one of the following conditions is met, no other access to the resource being permitted:
  - the user account is allocated to the first group and an access key associated with the user account is presented at the access control device at the determined time for accessing the respective resource; or
  - the user account is allocated to the second group and an access key after a request to access the resource has been received by the electronic queue management server, wherein the user account is allowed access immediately after the request has been received by the electronic queue management server.

2. The queuing system of claim 1, further comprising:
an access key registration record, configured to record an association between each access key and the respective at least one user account associated with the access key, the access key registration record being in communication with the electronic queue management server for communication of information about an access key in respect of which a request has been received, wherein the access key registration record is further configured to allocate the at least one user account to one of the plurality of groups.

3. The queuing system of claim 1, wherein data indicating which of the plurality of groups the at least one user account has been allocated to is stored by:
a queue manager; and/or
the respective access key.

4. The queueing system of claim 1, wherein at least one user account is allocated to the first group and at least one user account is allocated to the second group.

5. The queuing system of claim 1, wherein the cool down period is determined based on the waiting time associated with the resource.

6. The queuing system of claim 1, wherein the electronic queue management server is further configured to select one or more user accounts from those allocated to a first virtual queue of the one or more virtual queues, the selected one or more user accounts each having a respective current position or wait time in the first virtual queue, the electronic queue management server being further configured to reallocate the selected one or more user accounts to a reallocated position or wait time within the first virtual queue or within a second virtual queue from the one or more virtual queues.

7. The queuing system of claim 1, wherein the electronic queue management server is further configured to:
send an electronic message to the at least one user account, where the at least one user account is allocated to the first group, the electronic message indicating an estimated time to reach the front of the first virtual queue or an estimated time at which the at least one user account will reach the front of the first virtual queue; and
send an electronic message to the at least one user account, where the at least one user account is allocated to the second group, the electronic message indicating the cool down period, wherein the cool down period is based on the estimated time to reach the front of the first virtual queue.

8. The queuing system of claim 7, wherein the electronic queue management server is configured to manage the first virtual queue by predicting removal of or removing a number of user accounts from the front of the queue according to a set rate, and wherein the estimated time is based on the set rate.

9. The queuing system of claim 7, wherein the electronic queue management server is configured to send an electronic message to the at least one user account via the access key associated with the at least one user account, the electronic message indicating the estimated time and/or cool down period.

10. The queuing system of claim 1, wherein the electronic queue management server is configured to manage the first virtual queue by predicting removal of or removing a number of user accounts from the front of the queue according to a set rate.

11. The queuing system of claim 10, wherein the electronic queue management server is configured to determine the waiting time based on the set rate and/or a number of user accounts in the first virtual queue.

12. The queuing system of claim 10, wherein the rate is set on the basis of a proportion of resource throughput or capacity.

13. The queuing system of claim 12, wherein the proportion is set on the basis of a reliability performance for the resource, wherein the reliability performance is based on one or more of: a variability of throughput for the resource; a rate of unexpected closure for the resource; a rate of unexpected closure for one or a more other resources.

14. The queuing system of claim 1, wherein each of the plurality of access keys comprises one or more of: a portable communications device; a RFID device; a paper ticket.

15. The queuing system of claim 1, wherein the electronic queue management server is configured to receive the electronic requests through a wireless interface from an access key.

16. The queuing system of claim 1, wherein each access control barrier defines a respective physical buffer queue, the physical buffer queue allowing access to the respective resource for all user accounts that have passed through the access control barrier.

17. The queuing system of claim 16, wherein the set rate is based on a length of the physical buffer queue of the resource associated with the first virtual queue.

18. The queuing system of claim 16, wherein the electronic queue management server is configured to set the cool down time of user accounts in the second group requesting access to a resource based on a length of the physical buffer queue of the resource.

19. A method of managing a queuing system for controlling access by a plurality of user accounts to one or more resources, the plurality of user accounts having a plurality of access keys, each access key being associated with at least one user from the plurality of user accounts, wherein the at least one user account is allocated to one of a plurality of groups, wherein the plurality of groups comprises a first group and a second group, the method comprising:
  receiving, by an electronic queue management server and via a communications network, electronic requests for resource access, each request relating to a respective access key and being for the at least one user account associated with the access key to access resource from the one or more resources;
  managing, by the electronic queue management server, the one or more virtual queues in respect of the one or more resources, each of the at least one virtual queue being associated with a respective resource of the one or more resources;
  for each request received, determining, by the electronic queue management server, a waiting time associated with the resource for the respective at least one user account, and:
    if the at least one user account is allocated to the first group:
      adding, by the electronic queue management server, the respective at least one user account to a virtual queue associated with the respective resource,
      sending, via the communications network, an electronic message comprising the waiting time indicating a time at which the respective at least one user account in respect of each request reaches a front of the respective virtual queue and can access the resource associated with the respective virtual queue on presentation of the respective access key at a sensor of an access control device in communication with the electronic queue management server, where the access control barrier is controlled to open on presentation of the respective access key at the access control device at or after the indicated time,
    if the at least one user is allocated to the second group:
      sending, by the electronic queue management server and via the communications network, an electronic message communicating that the at least one user account can access the resource immediately after a request to access the resource has been received by the electronic queue management server instead of allocating the at least one user account to the virtual queue associated with the resource, thereby allowing access to the resource by the at least one user account immediately after a request to access the resource has been received by the electronic queue management server on presentation of the respective access key at the sensor of the access control device, where the access control barrier is controlled to open on presentation of the respective access key at the access control device after the request has been received by the electronic queue management server, and
      preventing, by the electronic queue management server, the at least one user account from requesting to access further resources during a cool down period after access to the resource has been provided; and
    sending, from the electronic queue management server to the access control device and via the communications network, an electronic message comprising instructions to control access through an access control barrier of the access control device to the resource such that access to the resource is only allowed if one of the following conditions are met, no other access to the resource being permitted:
      the user account is allocated to the first group and an access key associated with the user account is presented at the sensor of the access control device at the determined time for accessing the resource, or
      the user account is allocated to the second group and an access key associated with the user account is presented at the sensor of the access control device after a request to access the resource has been received by the electronic queue management server, wherein the user account is allowed access immediately after the request has been received by the electronic queue management server.

* * * * *